United States Patent [19]
Kane

[11] Patent Number: 5,878,791
[45] Date of Patent: Mar. 9, 1999

[54] GAS EXCHANGE DEVICE

[76] Inventor: William D. Kane, 576 Seaward Dr., Charleston, S.C. 29412

[21] Appl. No.: 847,686

[22] Filed: Apr. 28, 1997

[51] Int. Cl.[6] .................................................. B65B 31/00
[52] U.S. Cl. .............................. 141/59; 141/38; 141/63; 141/70; 141/82; 137/226
[58] Field of Search .................................. 141/4, 38, 63, 141/67, 70, 59, 82; 137/223, 224, 226

[56] References Cited

U.S. PATENT DOCUMENTS

| | | | |
|---|---|---|---|
| 2,339,381 | 1/1944 | Crowley | 141/38 |
| 2,581,914 | 1/1952 | Darrow | 137/226 |
| 2,702,962 | 3/1955 | Fraites | 141/4 |
| 2,784,748 | 3/1957 | Eichenlaub | 141/65 |
| 3,468,348 | 9/1969 | Sperberg | 141/38 |
| 3,498,341 | 3/1970 | Sperberg | 141/4 |
| 3,498,343 | 3/1970 | Sperberg | 141/38 |
| 3,669,159 | 6/1972 | Owens, Jr. | 141/38 |
| 3,727,651 | 4/1973 | Biever | 141/82 |
| 3,877,496 | 4/1975 | Sperberg | 141/4 |
| 4,477,477 | 10/1984 | Arter | 141/70 |

*Primary Examiner*—J. Casimer Jacyna
*Attorney, Agent, or Firm*—W. Alex Dallis, Jr.

[57] ABSTRACT

A gas exchange device designed to displace existing air or gas inside a pressurizable or inflatable article with an inert, dry gas such as nitrogen. The gas exchange device includes an elongated injection tube which inserts into a valve or opening of a pressurizable or inflatable article. As an inert gas is injected into the article through the elongated injection tube, the interior gas is exhausted through the article valve or opening into an exhaust receiving orifice. The exhausted gas is controlled so that it may be monitored for moisture content.

5 Claims, 3 Drawing Sheets

GAS EXCHANGE DEVICE

BACKGROUND OF THE INVENTION

1. Field of the Invention

The present invention relates to the field of gas exchange devices and more particularly, to a device designed to inject inert gas into the interior of a tire and displace the existing tire air while controlling the exiting gases to allow monitoring of relative humidity.

2. Description of the Related Art

The proper pressure maintenance of a pressurizable article depends upon the particular use and application of a pressurizable article. Typically, the primary needs relating to pressurizable articles is to simply maintain a desired pressure, as gas pressure inside an article will typically effect the operation and function of the article, whether it be a vehicle tire, an air mattress or life preserver. Depending upon the material used and quality of "air tightness", a pressurizable article will typically lose compression over time. This can is usually corrected by simply re-inflating the article. Under special circumstances, however, a pressurizable article may be subject to variable temperature conditions. If the temperature fluctuations are substantial, the air pressure inside the article may fluctuate dramatically without the introduction or release of any air into or out of the pressurizable article. Depending upon the particular application of the pressurizable article, its performance and use may be adversely effected by such a dramatic increase or decrease in pressure.

An example of a pressurizable article whose performance may be acutely affected by fluctuations in temperature is a vehicle tire. In particular, the added heat created from friction of a tire used on a high speed automobile may increase air temperature inside the tire by more than 240 degrees Fahrenheit. Under ideal gas (or inert gas) conditions the increase in air pressure is functionally related to the increase in temperature and may even be predicted. Under such "ideal" conditions, tire pressure increases are not likely to fluctuate dramatically, but instead would simply be incremental in accordance with the ideal gas law. However, the presence of an impurity such as moisture or water inside a tire can cause a detrimental alteration of the internal tire pressure.

Under certain auto racing conditions, the vehicle tires may reach very high temperatures. Unless the tires are completely vacated of impure air, even the smallest amount of moisture may be present in the tire originally from the manufacture or moisture may enter the tire through inflation with ambient air containing a significant relative humidity levels. The effect of water inside a tire may have an extreme effect upon tire pressure after an increase in temperature. This is particularly the case if the desired tire pressure is initially established when water that is present in the tire may in a condensed or liquid form and, after being exposed to a significant increase in temperature, the condensed liquid changes to a gaseous form thereby dramatically increasing the pressure inside the tire. Auto racing performance depends upon numerous variables including the ability to control such variables. Dramatic fluctuations in tire pressure will adversely affect auto car handling and will result in a competitive disadvantage.

Most existing air inflation and deflation control devices for pressurizable articles are designed to make it easier to control the existing pressure within a pressurizable article. Examples of such inventions and devices include U.S. Pat. No. 5,297,576 to Weinheimer which is described as an oral inflation and relief tube. This device is designed to act as both an inflation and relief valve for inflatable objects. The inflation relief tube is equipped with a mounting flange that can be sealed through the wall of a bladder of the inflation article. The pressurizable article may be easily inflated or deflated by simply manipulating the proper end of the oral inflation and relief tube. The Weinheimer invention, however, is not designed to displace or exchange existing air inside the pressurizable article or reduce humidity levels within the pressurizable article.

Another example of a pressure control device is described in U.S. Pat. No. 5,181,977 to Gneiding et al. which is a tire inflation valve having an over-pressure and flow control. This device is intended to replace and existing valve mount. The new valve regulates over pressuring the tire by having an internal valve disc lift when the predetermined pressure is reached thereby venting the fill gas. Although this device is well suited to control over pressure problems within a tire, if the tire cools in temperature, there may be a significant decrease in pressure, particularly if the tire gas has a high relative humidity. Such an under-inflated condition would be unacceptable for certain operations.

An example of a device designed to filter out moisture from a compressed gas prior to injection into an inflatable article or pneumatic hose is U.S. Pat. No. 5,522,910 to Fogal, Sr. described as an end-line compressed air moisture filter. The device contains an internal filter element designed to remove the moisture from the compressed air as the air passes through the valve stem.

As is evidenced by the cited prior art, there exist numerous devices designed to control over pressure of pressurizable articles or even the moisture content of injected air; however, none of these devices are designed to displace the existing air and moisture in a pressurizable article while allowing for the monitoring of relative humidity levels of the exhausted gases. The present invention is specially designed to inject inert, moisturefree gas into a pressurizable article to replace the existing air inside the pressurizable article. During the air replacement process the exhausted air may be monitored for moisture content for the purpose of ensuring that the pressurizable article contains a very low relative humidity level. For best result, the injected, inert gas is heated prior to injection into the tire so that water condensation within the tire interior will more easily be volatilized and evacuated from the interior of the tire. The present invention is ideally suited for use in auto racing conditions where auto tire pressure stability can be crucial for maximum performance.

SUMMARY OF THE INVENTION

It is therefore an objective of this invention to easily and efficiently exchange the air inside a pressurizable article with an inert gas.

It is further an objective of this invention to remove water condensation and moisture within a pressurizable article for the purpose of reducing the relative humidity level within a pressurizable article.

It is still further an objective of this invention to control the exhaust gases exiting the interior of a pressurizable article while the pressurizable article is being injected with an inert gas.

These as well as other objectives are accomplished by a gas exchange device designed to inject an inert gas through an elongated injection tube which is inserted through the valve of a pressurizable article such as a tire. It is necessary to remove any valve obstructions, such as a valve core, for proper insertion of the elongated injection tube though the valve. The gas exchange device has an outer insertion nozzle which is temporarily secured over the tire valve. The elongated injection tube runs through the interior of the outer insertion nozzle leaving an interstitial space between the interior of the outer insertion nozzle and the exterior of the elongated injection tube. When inert gas is injected into the tire through the elongated injection tube, the increased pressure within the tire causes the gases inside the tire to exhaust through the interstitial space between the interior of the outer insertion nozzle and the injection tube.

Ideally, the inert gas injected into the pressurizable article is heated above ambient temperatures for the purpose of volatilizing any water that may be present inside the tire in a liquid or condensed form. The gas injection process is continued until such time that gas inside the article interior has been sufficiently displaced by the injected, inert gas and sufficient moisture has been removed. This process length will vary depending upon the size of the article, internal temperature and moisture content. In order to best determine when this process is complete, the operator should monitor the exhausted gases for relative humidity using a standard relative humidity monitor. The exhausted gases are controlled by a primary exhaust chamber designed to direct the exhaust gases to a humidity monitoring device such a relative humidity probe and monitor. The relative humidity probe and monitor will record the relative humidity level of the exhausted gases until the relative humidity of the gases exiting the interior of the tire have been reduced to an acceptable level.

BRIEF DESCRIPTION OF THE DRAWINGS

A preferred embodiment of the present invention is described herein with reference to the drawings wherein.

DETAILED DESCRIPTION OF THE PREFERRED EMBODIMENT

Figure 1:
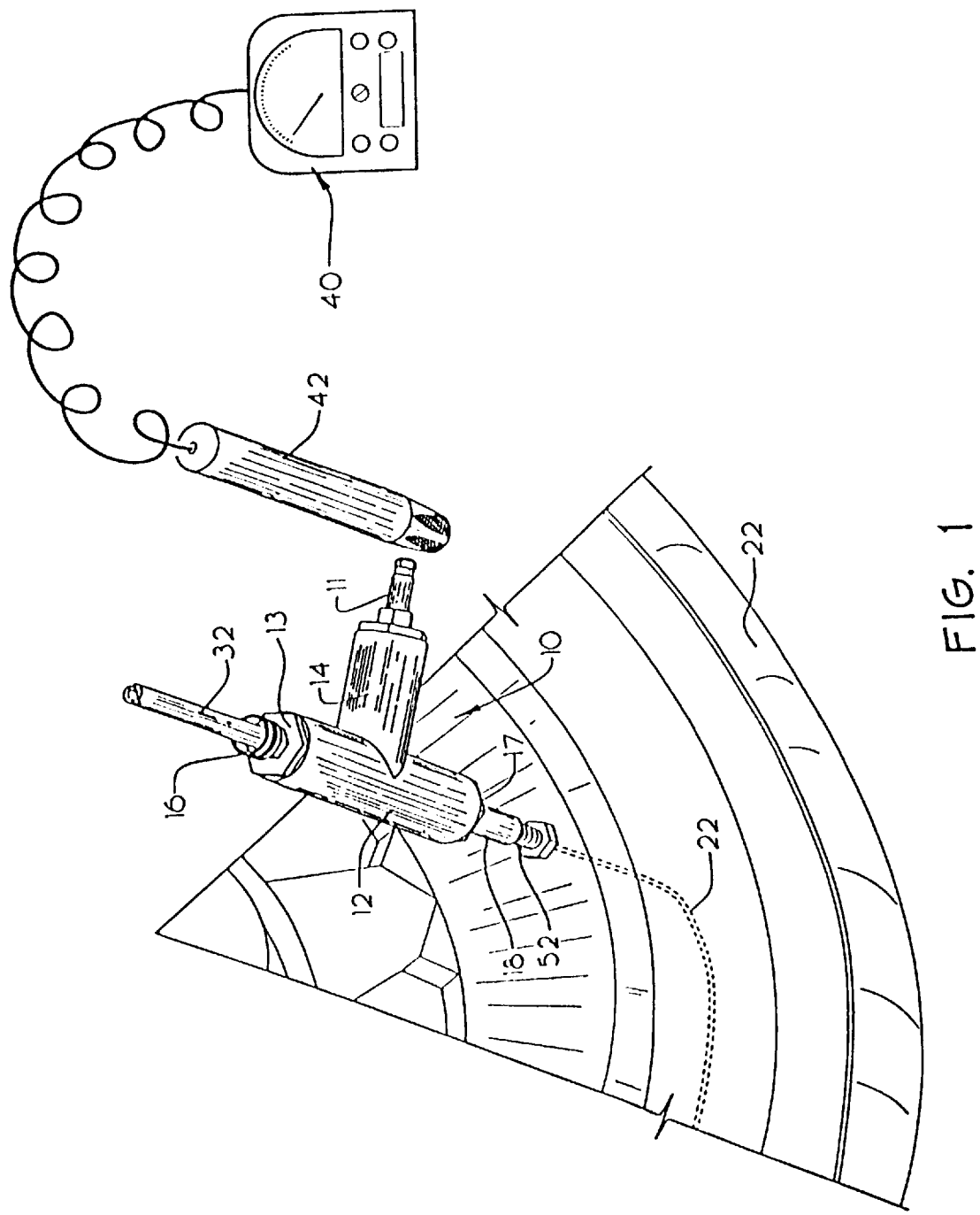
FIG. 1 of the drawings is a perspective view of the gas exchange device attaching to a tire valve.
Figure 2:
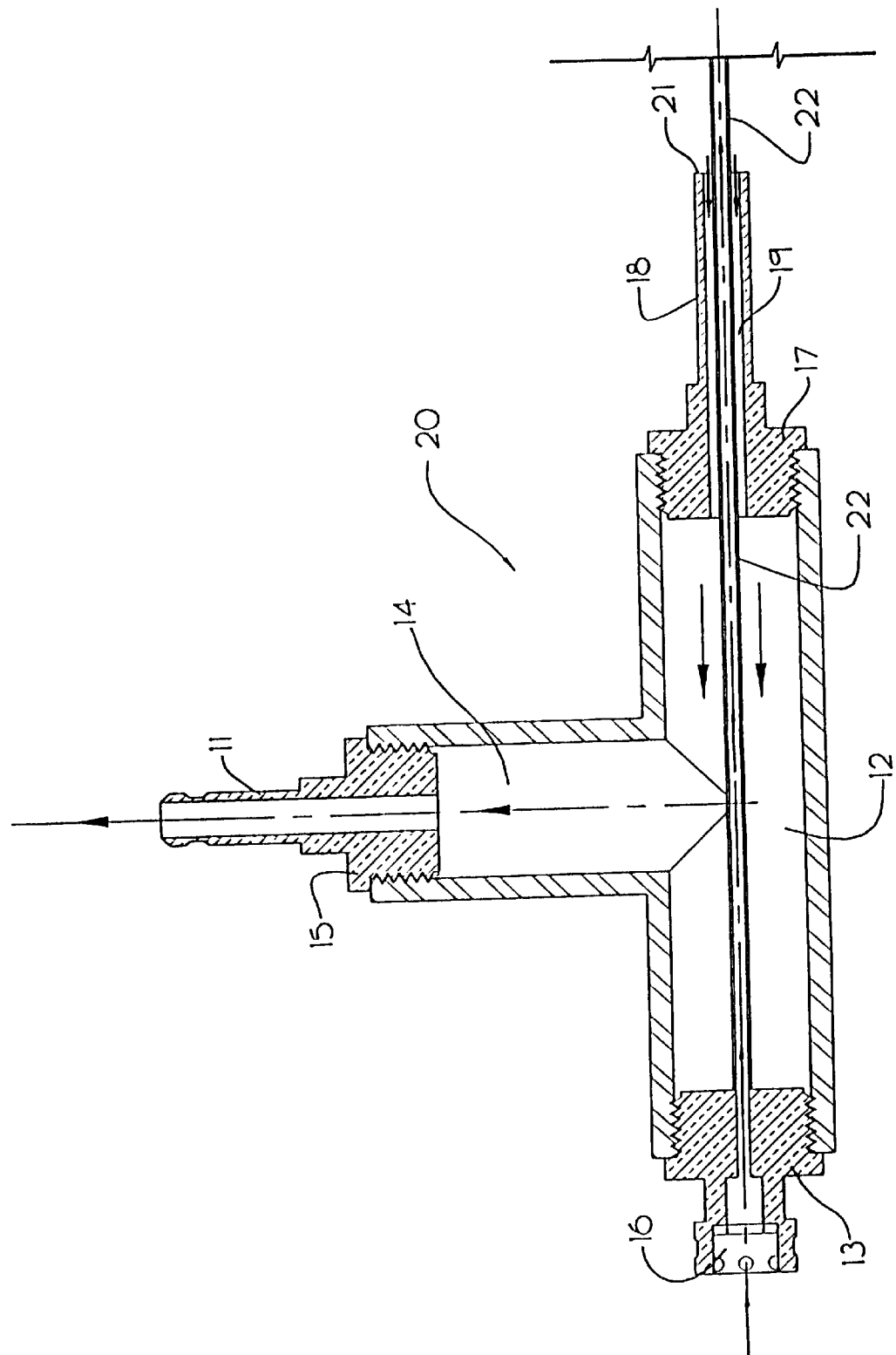
FIG. 2 of the drawings is a cross sectional view of the gas exchange device.
Figure 3:
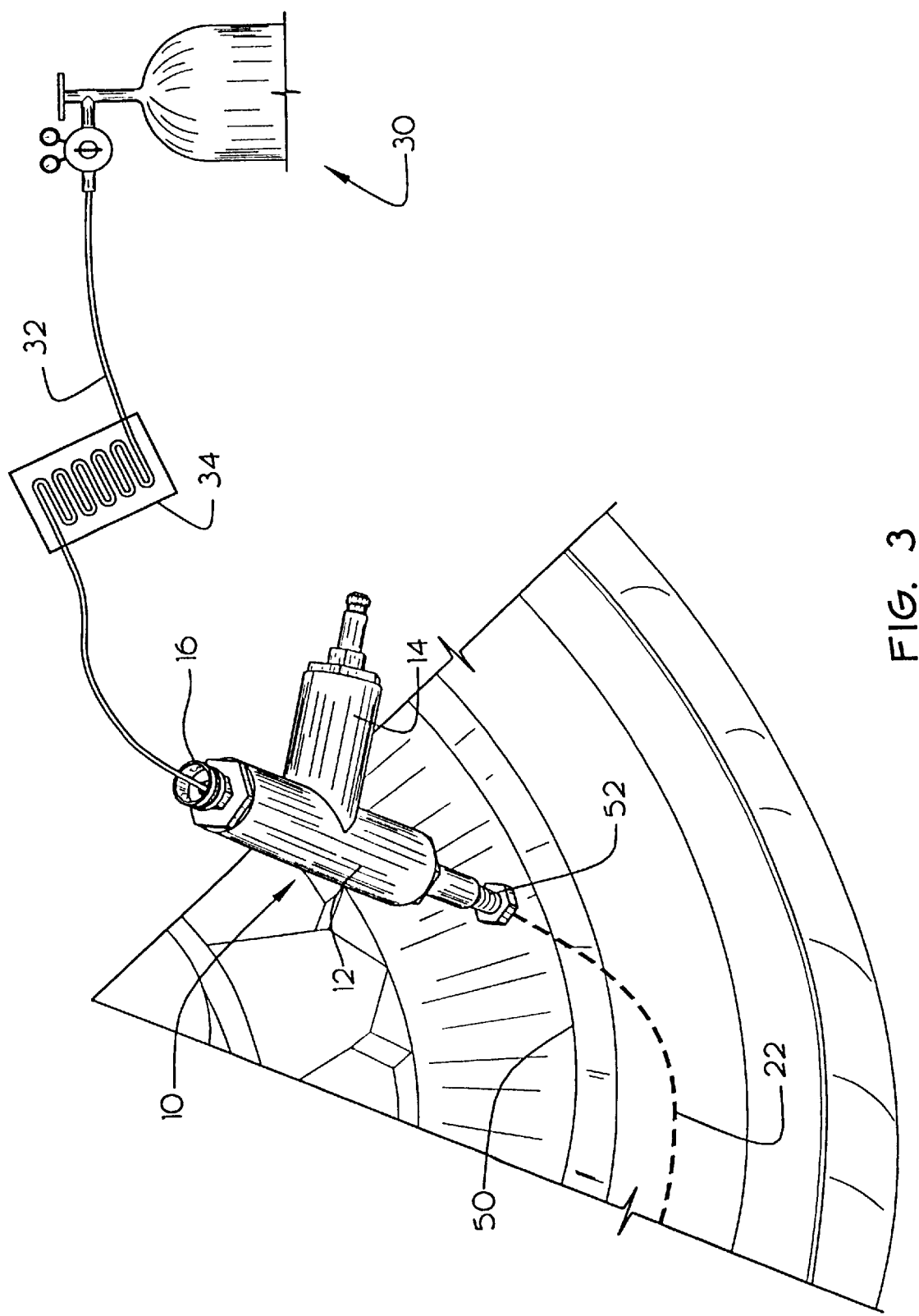
FIG. 3 of the drawings is a perspective view of the gas exchange device showing the device attached to a tire valve with a compressed gas source and gas line heater.

Referring to the drawings by numerals of reference, there is shown in FIGS. 1, 2 and 3 the gas exchange device (10) used for exchanging air in a pressurizable article such as a tire (50). FIG. 1 shows the gas exchange device (10) as a unit attaching to a tire valve (52). The exhausted air from the tire (50) passes through a injector exhaust outlet (11) to a humidity monitoring device (40).

Referring to FIG. 1, the gas exchange device (10) is shown temporarily secured to a tire valve (52) of an automobile tire (50). The gas exchange device (10) is designed to inject a compressed gas into the interior of a tire (50) and to control the gases that exhaust from the tire during the gas exchange processes. The source of the compressed gas to be injected into the tire (50) is, ideally, a pressurized inert gas such as a nitrogen. The pressurized inert gas tube (32) is secured to the gas exchange device (10) by means of a tube coupling (16) which is sealed to the gas exchange device (10) by means of an injection gas tube fitting (13).

Referring to FIGS. 1 and 2, the means for controlling the exhausted gas from the tire (50) is accomplished by the gas exchange device (10) receiving the exhausted gas into a primary exhaust chamber (12) that diverts these exhausted gases into an injector exhaust chamber (14) and then through an injector exhaust outlet (11). The injector exhaust outlet (11) is secured to the gas exchange device (10) by an injector insertion fitting (15). The outer insertion nozzle (18) is designed to fit over the outer covering of the tire valve (52) so that the exhausted air from the tire (50) may be captured by the exhausted gas receiving orifice (21) which conveys the exhausted gas into the primary exhaust chamber (12) of the gas exchange device (10). An elongated injection tube (22) runs coaxially through the center of the outer insertion nozzle (18) and is the conduit for conveying a gas into the tire (50) interior. For optimum operation, the length of the elongated injection tube (22) should be sufficient to reach approximately half way around the interior circumference of the interior of the tire (50). The purpose of a sufficiently long elongated injection tube (22) is to more evenly distribute the injected gas throughout the entire interior of the tire (50).

Before the elongated injection tube (22) can be inserted into the tire (50), the tire valve (52) must have its valve core removed in order to allow insertion of the elongated injection tube (22). The outside diameter of the elongated injection tube (22) is narrow in diameter than the inside diameter of the outer insertion nozzle (18) which creates an interstitial space (19) between the elongated injection tube (22) and outer insertion nozzle (18). When gas is injected into the tire (50) through the elongated injection tube (22) the pressure increase within the tire (50) interior forces exhaust gases out of the tire (50) through the tire valve (52) and into the interstitial space (19) between the elongated injection tube (22) and outer insertion nozzle (18). The exhausted gases are then diverted into the primary exhaust chamber (12) and then through the injector exhaust chamber (14) before exiting through the injector exhaust outlet (11).

Referring to FIGS. 1, 2 and 3, the exhaust gases that exit the tire (50) when gas is injected into the interior of the tire (50) are temporarily contained within the primary exhaust chamber (12) of the gas exchange device (10). In order to properly monitor the exhaust gas for humidity, the gas exchange device (10) directs the exhaust gas into the injector exhaust chamber (14) and through the injector exhaust outlet (11). The gases exiting the gas exchange device (10) may be monitored for readings such as relative humidity by a humidity monitoring device (40) as shown in FIG. 1. A probe (42) may be used to monitor the exhausted gas so that the operator may determine the desired humidity level of the gas inside the tire (50). The relative humidity monitoring of the tire exhaust gas may be accomplished by a humidity monitoring enclosure to optimize humidity readings provided by the probe (42).

Referring to FIG. 3, a compressed gas source (30) used to inject into the tire (50) is depicted. Nitrogen gas is an example of an inert gas that is well suited for use with the gas exchange device (10). The compressed gas is conveyed into the gas exchange device (10) via a pressurized gas tube (32) which is connected to the gas exchange device (10) by a tube coupling (16). For optimum operation, the compressed gas is heated prior to injection into the tire (50). A heater (34) is depicted in FIG. 3 for increasing the compressed gas temperature to between 5 and 30 degrees Fahrenheit above ambient temperature. The heated gas warms the inside of the tire (50) by volatilizing any condensed water or moisture within the tire (50).

A preferred embodiment of the present invention is described herein. It is to be understood, of course, that changes and modifications may be made in the embodiment without departing from the true scope and spirit of the present invention as defined by the appended claims.

That which is claimed is:

1. A device for exchanging gas inside a pressurizable article, comprising in combination:

an elongated injection tube having an outside diameter, exterior surface and a hollow interior through which a gas flows, said elongated injection tube being insertable through a valve of said pressurizable article;

an outer insertion nozzle with a nozzle interior having an inside diameter greater in dimension than said outside diameter of said elongated injection tube, said elongated injection tube residing coaxially inside said nozzle interior creating an interstitial space between said nozzle interior and said exterior surface of said elongated injection tube, said outer insertion nozzle having an exhaust gas receiving orifice capable of temporarily securing over said valve such that an air seal is created between said exhaust gas receiving orifice and said valve of said pressurizable article; and a means for controlling an exhaust gas emitted from said valve when said gas is injected through said elongated injection tube and into said pressurizable article whereby said exhaust gas is forced out of said pressurizable article through said valve.

2. The device for exchanging gas inside a pressurizable article according to claim 1 wherein said means for controlling said exhaust gas comprising a primary exhaust chamber having an injector exhaust outlet for releasing said exhaust gases out of said primary exhaust chamber.

3. The device for exchanging gas inside a pressurizable article according to claim 1 further comprising a means for heating said gas injected into said pressurizable article through said elongated injection tube.

4. The device for exchanging gas inside a pressurizable article according to claim 3 further comprising a compressed gas source from which said gas is derived, said compressed gas source comprising:

a compressed gas tank containing nitrogen gas;

a pressurized gas regulator for pressure regulation of said gas; and a pressurized gas tube for conveying said gas from said compressed gas tank to said elongated injection tube.

5. The device for exchanging gas inside a pressurizable article according to claim 4 wherein said means for heating said gas comprises an electric heating enclosure inside which a portion of said pressurized gas tube resides, said heating enclosure having a thermocouple control for regulation of said electric heating enclosure, said electric heating enclosure heating said gas injected into said elongated injection tube to a temperature between 5 and 30 degrees Fahrenheit above an ambient temperature.

* * * * *